(12) United States Patent
Nakayama et al.

(10) Patent No.: US 11,811,996 B2
(45) Date of Patent: Nov. 7, 2023

(54) INFORMATION PROCESSING SYSTEM, TERMINAL DEVICE, AND NON-TRANSITORY COMPUTER READABLE MEDIUM

(71) Applicant: FUJIFILM Business Innovation Corp., Tokyo (JP)

(72) Inventors: Yuta Nakayama, Kanagawa (JP); Tetsuya Kobayashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/546,056

(22) Filed: Dec. 9, 2021

(65) Prior Publication Data
US 2022/0311878 A1 Sep. 29, 2022

(30) Foreign Application Priority Data

Mar. 25, 2021 (JP) .................................. 2021-052098
Aug. 16, 2021 (JP) .................................. 2021-132409

(51) Int. Cl.
*H04N 1/00* (2006.01)
*H04N 1/44* (2006.01)

(52) U.S. Cl.
CPC ....... *H04N 1/0097* (2013.01); *H04N 1/00204* (2013.01); *H04N 1/00413* (2013.01);
(Continued)

(58) Field of Classification Search
None
See application file for complete search history.

(56) References Cited

U.S. PATENT DOCUMENTS 9,164,712 B2 10/2015 Kaigawa
10,031,704 B2 7/2018 Nakamura
(Continued)

FOREIGN PATENT DOCUMENTS

JP 2004209907 7/2004
JP 2011040046 * 2/2011 ............... G06F 3/12
(Continued)

*Primary Examiner* — Beniyam Menberu
(74) *Attorney, Agent, or Firm* — JCIPRNET

(57) ABSTRACT

An information processing system includes: a first processor including an information processing device configured to, when connecting to an external device through wireless communication based on a first wireless communication method, which is a short-range wireless communication method, transmit connection information for connecting to the information processing device through wireless communication based on a second wireless communication method different from the first wireless communication method to the connected external device; and a second processor including a terminal device configured to acquire the connection information by connecting to the information processing device through the wireless communication based on the first wireless communication method, and connect to the information processing device through the wireless communication based on the second wireless communication method in accordance with the acquired connection information and transmit authentication information for the information processing device to perform authentication processing.

14 Claims, 9 Drawing Sheets

(52) U.S. Cl.
CPC ....... *H04N 1/00514* (2013.01); *H04N 1/4413* (2013.01); *H04N 1/4433* (2013.01); *H04N 2201/0094* (2013.01)

(56) References Cited

U.S. PATENT DOCUMENTS

| | | | |
|---|---|---|---|
| 10,387,088 | B2 | 8/2019 | Minegishi |
| 11,197,141 | B2 * | 12/2021 | Mihira ................. H04W 76/14 |
| 2003/0210420 | A1 * | 11/2003 | Yamauchi ............. G06F 21/608 358/1.14 |
| 2007/0146766 | A1 * | 6/2007 | Murakami ............. G06F 21/608 358/1.14 |
| 2014/0293314 | A1 * | 10/2014 | Amarendra ............. G06F 21/35 358/1.14 |
| 2016/0127581 | A1 * | 5/2016 | Suzuki .................... H04W 4/80 358/1.15 |
| 2018/0152599 | A1 * | 5/2018 | Fukuda .............. H04N 1/32122 |
| 2019/0384537 | A1 * | 12/2019 | Arai ...................... G06F 3/1238 |
| 2021/0105375 | A1 * | 4/2021 | Hayashi ............... H04N 1/4413 |

FOREIGN PATENT DOCUMENTS

| | | | | |
|---|---|---|---|---|
| JP | 2016185667 | * | 10/2016 | .............. G06F 3/12 |
| JP | 6156024 | | 7/2017 | |
| JP | 6366425 | | 8/2018 | |
| JP | 2020015266 | * | 1/2020 | .............. H04N 1/00 |
| JP | 2020074107 | | 5/2020 | |

* cited by examiner

| MANAGEMENT NUMBER | USER ID | PASSWORD |
|---|---|---|
| 1 | AAAA | BBBB |
| 2 | CCCC | DDDD |
| 3 | EEEE | FFFF |
| 4 | GGGG | HHHH |
| 5 | IIII | JJJJ |
| ⋮ | ⋮ | ⋮ |

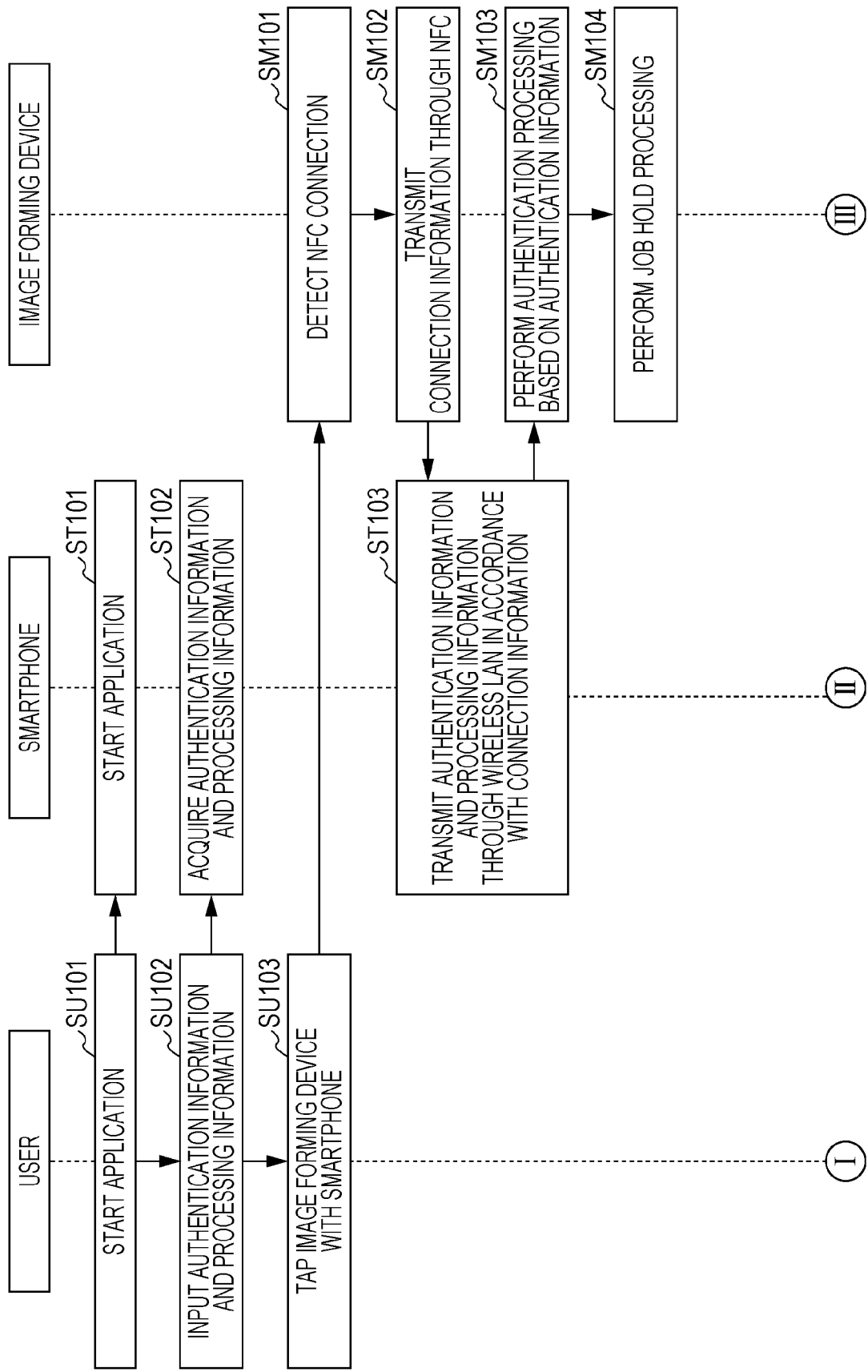

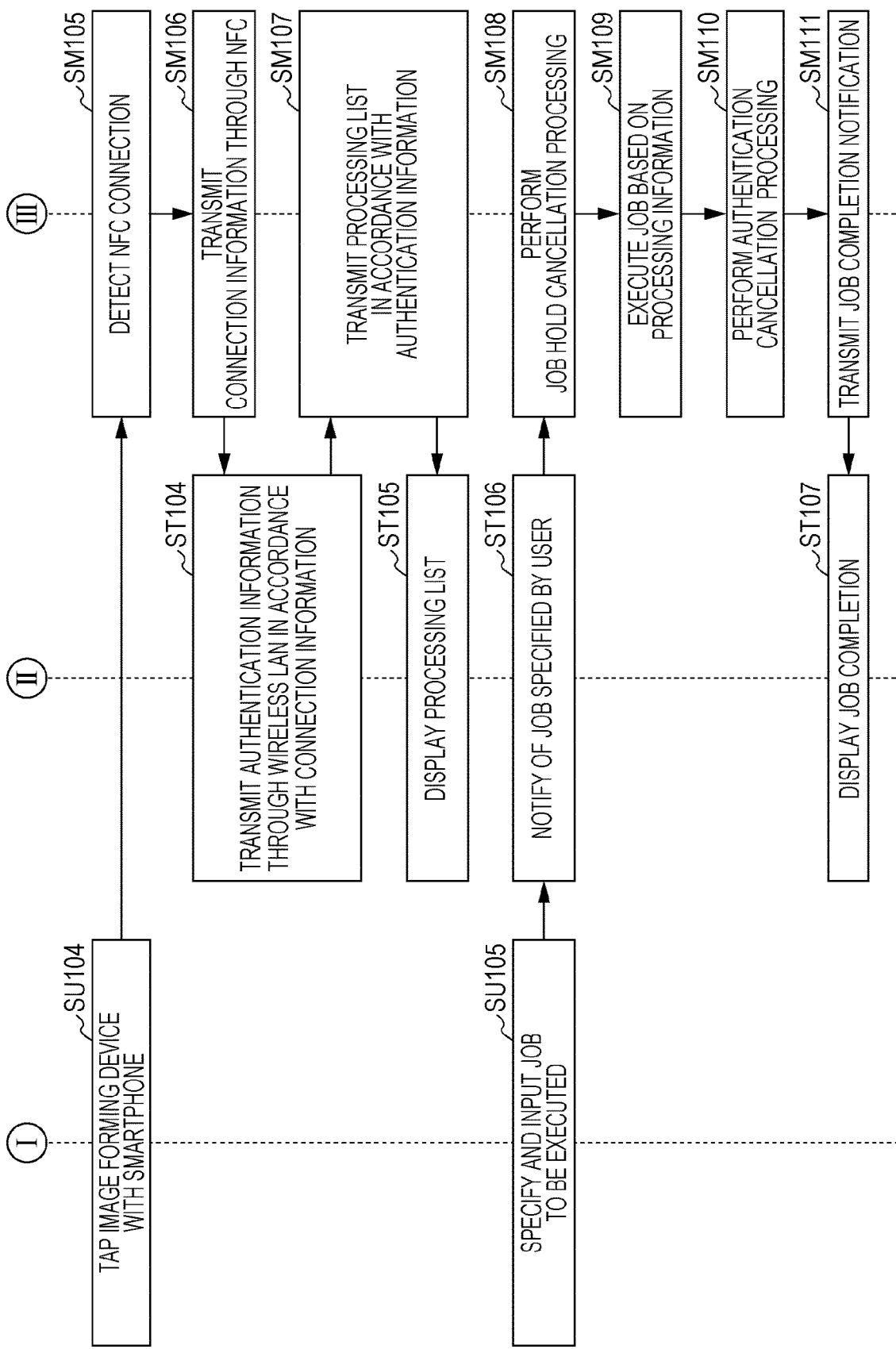

INFORMATION PROCESSING SYSTEM, TERMINAL DEVICE, AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-052098 filed Mar. 25, 2021 and Japanese Patent Application No. 2021-132409 filed Aug. 16, 2021.

BACKGROUND

(i) Technical Field

The present disclosure relates to an information processing system, a terminal device, and a non-transitory computer readable medium.

(ii) Related Art

A function executing device capable of effectively executing both a specific function based on an instruction from an external device through wireless communication and user authentication is disclosed in Japanese Patent No. 6156024.

A job processing device capable of saving time and effort in inputting authentication information when a job process is instructed from a terminal device is disclosed in Japanese Patent No. 6366425.

An information processing device capable of improving the user friendliness of equipment that may be operated using a smart device is disclosed in Japanese Unexamined Patent Application Publication No. 2020-074107.

SUMMARY

In recent years, information processing devices such as image forming devices that transmit, through wireless communication based on a short-range wireless communication method such as a near field communication (NFC), connection information for connecting to wireless communication based on a method other than the short-range wireless communication to a terminal device, receive processing information for performing printing processing from the terminal device through the wireless communication based on the method other than the short-range wireless communication in accordance with the connection information, and perform a process based on the processing information have been available.

Aspects of non-limiting embodiments of the present disclosure relate to an information processing system, a terminal device, and a non-transitory computer readable medium capable of allowing the terminal device to transmit, through wireless communication established in accordance with connection information acquired through wireless communication based on a short-range wireless communication method, authentication information to be used by an information processing device.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including: a first processor including an information processing device configured to, when connecting to an external device through wireless communication based on a first wireless communication method, which is a short-range wireless communication method, transmit connection information for connecting to the information processing device through wireless communication based on a second wireless communication method different from the first wireless communication method to the connected external device; and a second processor including a terminal device configured to acquire the connection information by connecting to the information processing device through the wireless communication based on the first wireless communication method, and connect to the information processing device through the wireless communication based on the second wireless communication method in accordance with the acquired connection information and transmit authentication information for the information processing device to perform authentication processing.

BRIEF DESCRIPTION OF THE DRAWINGS

Exemplary embodiments of the present disclosure will be described in detail based on the following figures, wherein:

FIG. 12 is a flowchart (the first half part) for explaining a process performed by an image forming system according to the second exemplary embodiment of the present disclosure; and FIG. 13 is a flowchart (the second half part) for explaining the process performed by the image forming system according to the second exemplary embodiment of the present disclosure.

DETAILED DESCRIPTION

First Exemplary Embodiment

Figure 1:
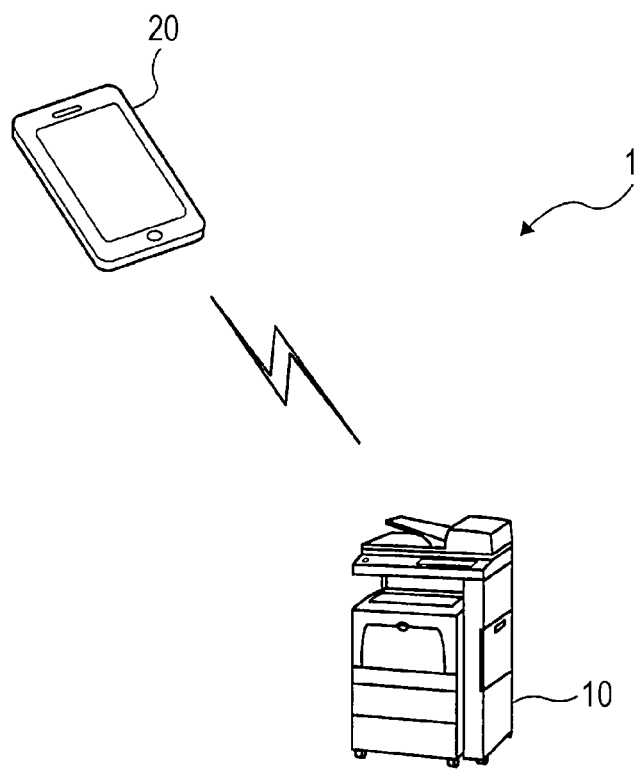
FIG. 1 is a diagram illustrating a system configuration of an image forming system according to a first exemplary embodiment of the present disclosure.

Hereinafter, exemplary embodiments of the present disclosure will be described in detail with reference to the drawings. FIG. 1 is a diagram illustrating a system configuration of an image forming system according to a first exemplary embodiment of the present disclosure. An image forming system 1 according to the first exemplary embodiment includes, as illustrated in FIG. 1, an image forming device 10 as an information processing device and a smartphone 20 as a terminal device.

In the image forming system 1, various job operations such as printing on the image forming device 10 is able to be performed using an operation screen of the smartphone 20. The image forming device 10 is a so-called multifunction machine having multiple functions including a print function, a scan function, a copy function, and a facsimile function.

In various operations for the image forming device 10 performed using the operation screen of the smartphone 20, before the smartphone 20 transmits processing information for instructing the image forming device 10 to perform a process to the image forming device 10, the smartphone 20 acquires connection information from the image forming device 10 through near field communication (NFC), which is wireless communication based on a short-range wireless communication method, between the image forming device 10 and the smartphone 20.

When the image forming device 10 is NFC connected to the smartphone 20, the image forming device 10 transmits connection information for connecting to the image forming device 10 through wireless local area network (LAN), which is wireless communication based on an internet communication method, to the smartphone 20. The connection information is an IP address of the image forming device 10. The connection information is not necessarily an IP address and may be any type of information as long as it is information for performing wireless communication between the image forming device 10 and the smartphone 20.

The image forming device 10 receives authentication information and processing information transmitted through wireless LAN from the smartphone 20 that is NFC connected to the image forming device 10. The authentication information is information for the image forming device 10 to perform authentication processing and includes, for example, a user ID and a password.

Furthermore, the processing information is information for the image forming device 10 to execute a job. The processing information may include an instruction for the image forming device 10 to execute a job. For example, in the case where a job to be executed when the image forming device 10 receives processing information is set in advance, the processing information may contain only information necessary for execution of the job without containing an instruction for the image forming device 10 to execute the job.

Specifically, in the case where data for which a job is to be executed is not necessary, such as the case where the job type is "copy", the processing information may contain, for example, the job type and accessory information necessary for execution of the job, such as "number of copies", "color mode", and "document size". Furthermore, in the case where data for which a job is to be executed is necessary, such as the case where the job type is "print", the processing information may contain, for example, the job type and accessory information necessary for execution of the job, such as "number of copies", "color mode", and "document size". Even in the case where data for which a job is to be executed is necessary, if the data for which the job is to be executed is prepared somewhere different from the smartphone 20, such as a cloud server, which is not illustrated in FIG. 1, the processing information does not necessarily contain the data for which the job is to be executed and may contain only information necessary for acquisition of the data, such as information of a place from which the data for which the job is to be executed will be acquired and a file name. That is, the processing information only needs to contain minimum information for enabling the image forming device 10 to execute a job.

The image forming device 10 performs authentication processing in accordance with the authentication information, and then executes the job in accordance with the processing information.

Figure 2:
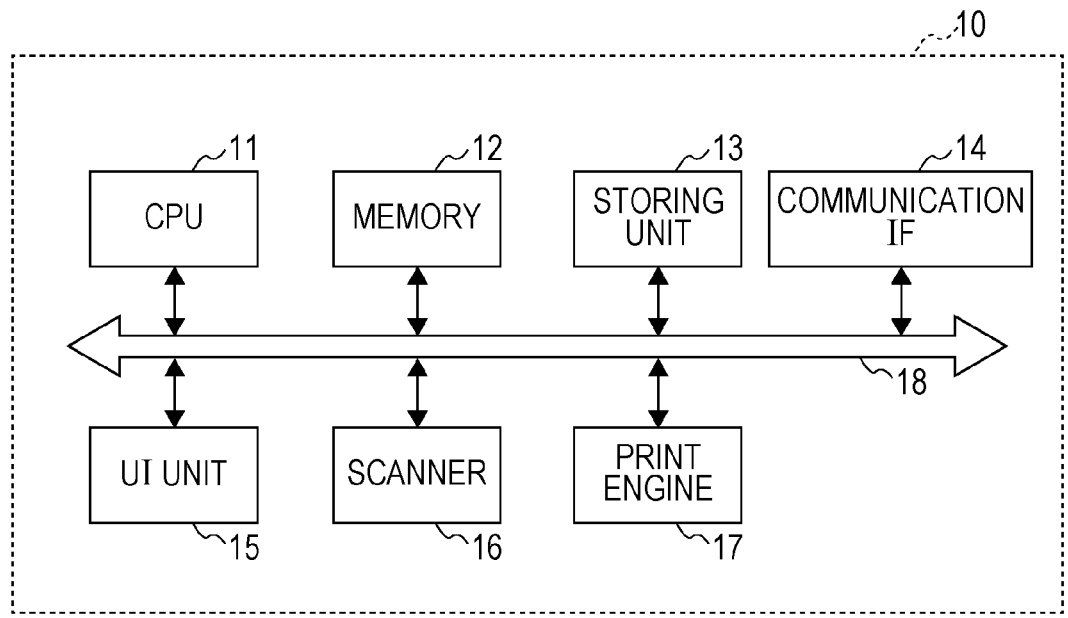
FIG. 2 is a block diagram illustrating a hardware configuration of an image forming device according to the first exemplary embodiment of the present disclosure.

FIG. 2 illustrates a hardware configuration of the image forming device 10 in the image forming system according to the first exemplary embodiment.

The image forming device 10 includes, as illustrated in FIG. 2, a central processing unit (CPU) 11, a memory 12, a storing unit 13 such as a hard disk drive, a communication interface (IF) 14 that transmits and receives data to and from an external device or the like, a user interface (UI) unit 15 that includes a touch panel or a liquid crystal display and a keyboard, a scanner 16, and a print engine 17. The components mentioned above are connected by a control bus 18.

The communication IF 14 includes multiple communication IFs including a communication IF that transmits and receives data to and from an external device or the like through NFC and a communication IF that transmits and receives data to and from an external device or the like through wireless LAN.

The print engine 17 prints an image on a recording medium such as printing paper through the processes of charging, exposure, developing, transfer, fixing, and the like.

The CPU 11 is a processor that performs a predetermined process in accordance with a control program stored in the memory 12 or the storing unit 13 and controls the operation of the image forming device 10. In the first exemplary embodiment, the case where the CPU 11 reads and executes the control program stored in the memory 12 or the storing unit 13 will be described. However, the program may be stored in a storing medium such as a compact disc-read only memory (CD-ROM) and provided to the CPU 11.

Figure 3:
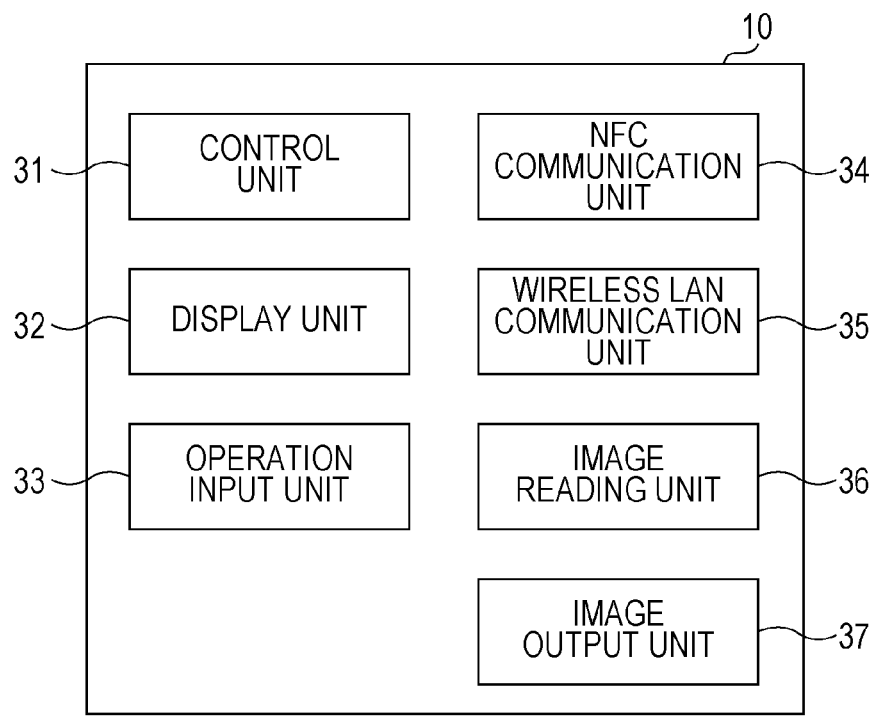
FIG. 3 is a block diagram illustrating a functional configuration of the image forming device according to the first exemplary embodiment of the present disclosure.

FIG. 3 is a block diagram illustrating a functional configuration of the image forming device 10 that is implemented by execution of the control program mentioned above.

The image forming device 10 according to the first exemplary embodiment includes, as illustrated in FIG. 3, a control unit 31, a display unit 32, an operation input unit 33, an NFC communication unit 34, a wireless LAN communication unit 35, an image reading unit 36, and an image output unit 37.

The display unit 32 displays, under the control of the control unit 31, various types of information for a user. The operation input unit 33 inputs various types of operation information from the user. The NFC communication unit 34 transmits and receives data to and from an external device such as the smartphone 20 through NFC. The wireless LAN communication unit 35 transmits and receives data to and from an external device such as the smartphone 20 through wireless LAN. The image reading unit 36 reads, under the control of the control unit 31, a document image from a set document. The image output unit 37 outputs, under the control of the control unit 31, an image to a recording medium such as printing paper.

The control unit 31 controls the entire operation of the image forming device 10. The control unit 31 generates print data based on a print job received from the smartphone 20 via the wireless LAN communication unit 35. The control unit 31 performs control such as controlling the image output unit 37 to output the generated print data and controlling the image reading unit 36 to read a document image.

When connecting to the smartphone 20, which is an external device, through NFC, the control unit 31 transmits to the smartphone 20 connection information for connecting through wireless LAN to the image forming device 10. When receiving authentication information and processing information from the smartphone 20 through wireless LAN, after performing authentication processing in accordance with the received authentication information, the control unit 31 executes a job instructed in the received processing information. Furthermore, after executing the job instructed in the processing information, the control unit 31 performs authentication cancellation processing for the smartphone 20.

In the first exemplary embodiment, the control unit 31 performs authentication processing for the smartphone 20, with reference to an authentication information management table stored in the storing unit 13. In an authentication information management table illustrated in FIG. 4, a user ID and a password are recorded in association with each other.

The control unit 31 receives a user ID and a password as authentication information from the smartphone 20, and performs, as authentication processing, a determination as to whether or not the received user ID and password are the same as contents of the authentication information management table, with reference to the authentication information management table.

In the case where it is determined that the received user ID and password are the same as the contents of the authentication information management table, the control unit 31 permits the smartphone 20 to log in. In the case where it is determined that the received user ID and password are not the same as the contents of the authentication information management table, the control unit 31 prohibits the smartphone 20 from logging in.

Figures 4, 5:
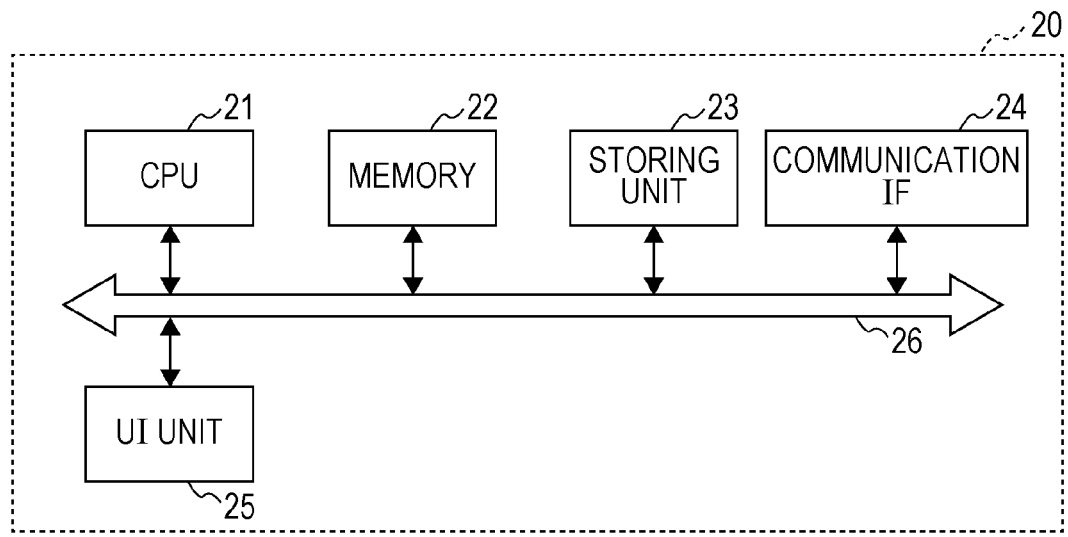
FIG. 4 is a diagram illustrating an example of an authentication information management table in the image forming device according to the first exemplary embodiment of the present disclosure.
FIG. 5 is a block diagram illustrating a hardware configuration of a smartphone according to the first exemplary embodiment of the present disclosure.

FIG. 5 illustrates a hardware configuration of the smartphone 20 in the image forming system according to the first exemplary embodiment.

The smartphone 20 includes, as illustrated in FIG. 5, a CPU 21, a memory 22, a storing unit 23 such as a flash memory, a communication IF 24 that transmits and receives data to and from an external device, and a UI unit 25 that includes a touch panel or a liquid crystal display or a keyboard. The components mentioned above are connected via a control bus 26.

The communication IF 24 includes multiple communication IFs including a communication IF that transmits and receives data to and from an external device or the like through NFC and a communication IF that transmits and receives data to and from an external device or the like through wireless LAN.

The CPU 21 is a processor that performs a predetermined process in accordance with a control program stored in the memory 22 or the storing unit 23 and controls the operation of the smartphone 20. In the first exemplary embodiment, the case where the CPU 21 reads and executes the control program stored in the memory 22 or the storing unit 23 will be described. However, the program may be stored in a storing medium such as an SD card and provided to the CPU 21.

Figure 6:
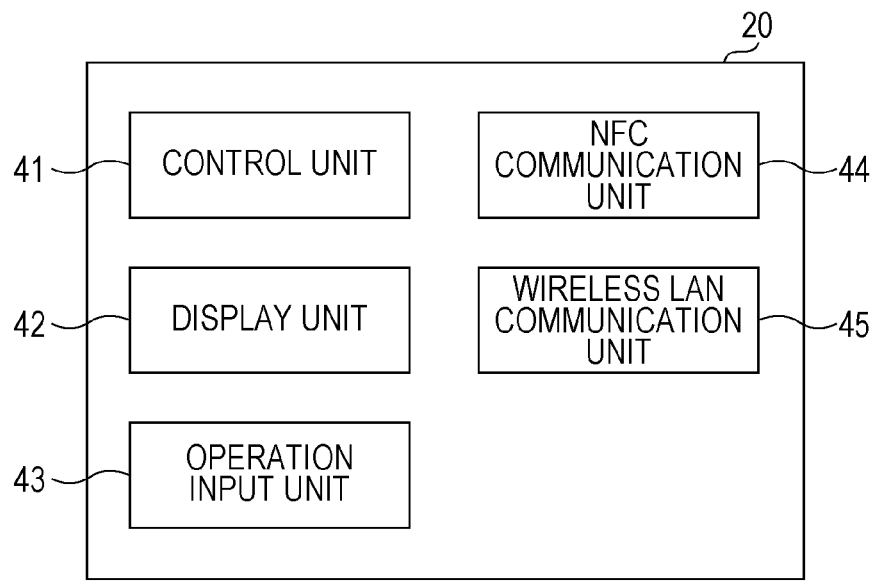
FIG. 6 is a block diagram illustrating a functional configuration of the smartphone according to the first exemplary embodiment of the present disclosure.

FIG. 6 is a block diagram illustrating a functional configuration of the smartphone 20 implemented by execution of the control program mentioned above.

The smartphone 20 according to the first exemplary embodiment includes, as illustrated in FIG. 6, a control unit 41, a display unit 42, an operation input unit 43, an NFC communication unit 44, and a wireless LAN communication unit 45.

The display unit 42 displays, under the control of the control unit 41, various types of information for the user. The operation input unit 43 inputs various types of operation information from the user. The display unit 42 and the operation input unit 43 may be implemented by a piece of hardware, such as a touch panel. The NFC communication unit 44 transmits and receives data to and from an external device such as the image forming device 10 through NFC. The wireless LAN communication unit 35 transmits and receives data to and from an external device such as the image forming device 10 through wireless LAN. The control unit 41 controls the entire operation of the smartphone 20.

Furthermore, the control unit 41 connects to the image forming device 10 through NFC to acquire connection information. The control unit 41 also connects to the image forming device 10 through wireless LAN in accordance with the acquired connection information, and transmits authentication information for the image forming device 10 to perform authentication processing and processing information for instructing the image forming device 10 to execute a job. These processes are performed by the smartphone 20 using an application for controlling the image forming device 10. Acquisition of the authentication information and the processing information is also performed by the smartphone 20 using the application.

The control unit 41 allows the user to enter a user ID and a password as authentication information, through the application for the controlling the image forming device 10. Furthermore, the control unit 41 allows the user to enter processing information for instructing the image forming device 10 to execute a job, through the application for controlling the image forming device 10.

Figure 7:
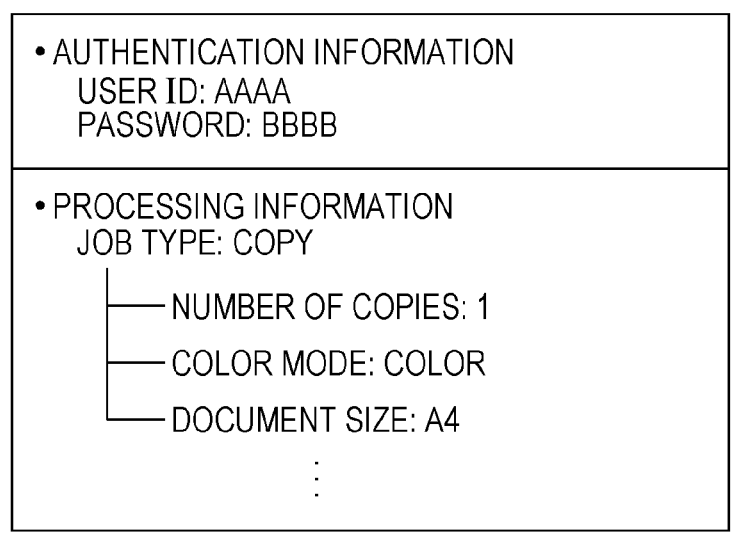
FIG. 7 is a diagram illustrating an example of authentication information and processing information transmitted from the smartphone according to the first exemplary embodiment of the present disclosure.

FIG. 7 is a diagram illustrating an example of authentication information and processing information. As illustrated in FIG. 7, a user ID and a password are acquired as authentication information. Furthermore, a job type and an accessory instruction set for the job type are acquired as processing information. For example, in the case where "copy" is set as the job type, "number of copies", "color mode", "document size", and the like are set as an accessory instruction.

Figure 8:
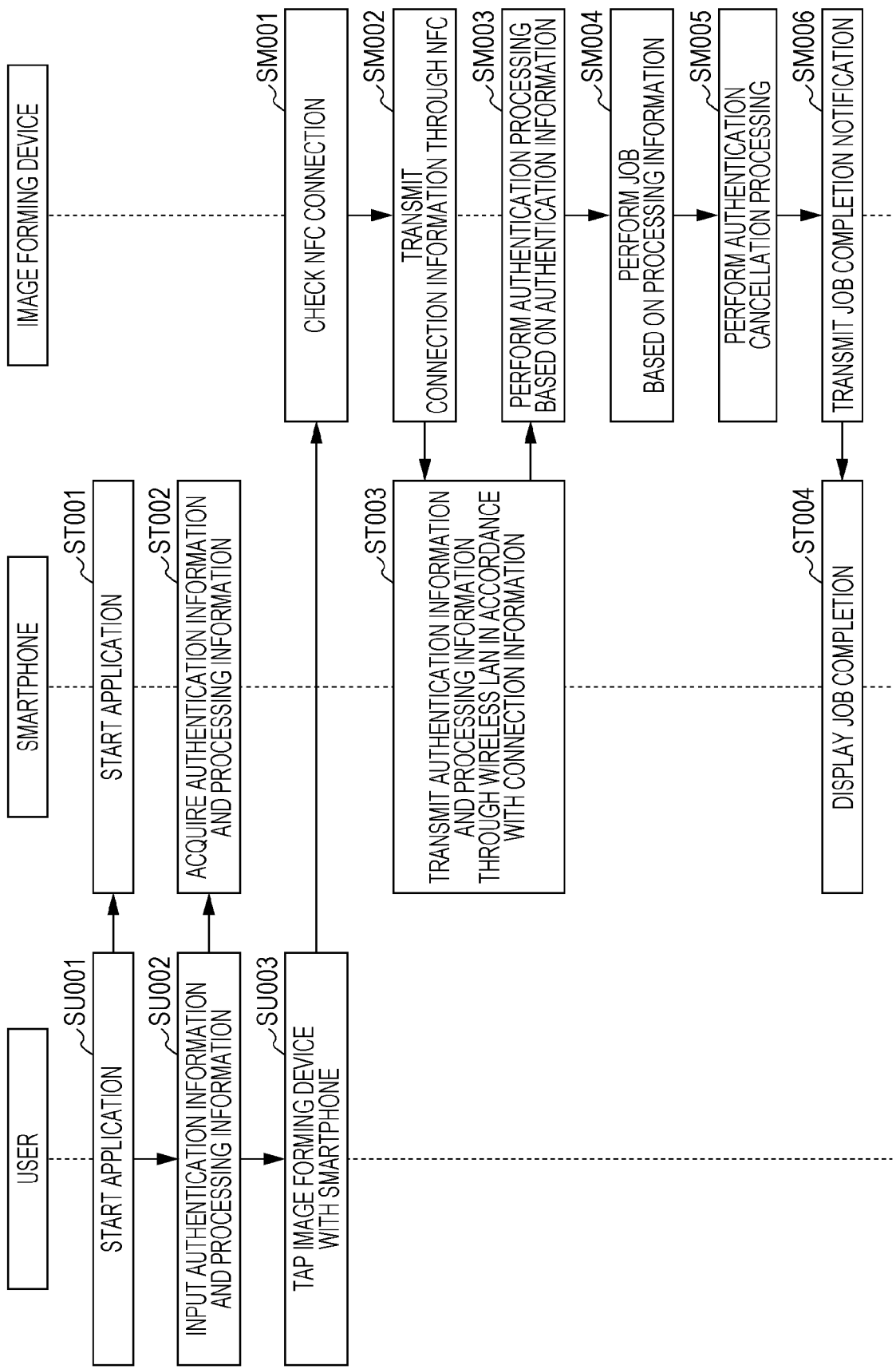
FIG. 8 is a flowchart for explaining a process performed by the image forming system according to the first exemplary embodiment of the present disclosure.

Next, a process performed by the image forming system 1 according to the first exemplary embodiment will be described with reference to a flowchart of FIG. 8.

First, in step SU001, the user starts, using the smartphone 20, an application for controlling the image forming device 10. In response to this, in step ST001, the control unit 41 of the smartphone 20 starts the application for controlling the image forming device 10.

Next, in step SU002, the user inputs, on the application, authentication information and processing information as illustrated in FIG. 7. In response to this, in step ST002, the control unit 41 of the smartphone 20 acquires the authentication information and the processing information.

Next, in step SU003, the user taps an NFC reader of the image forming device 10 with the smartphone 20.

In response to this, the control unit 31 of the image forming device 10 detects NFC connection in step SM001, and transmits connection information to the smartphone 20 through NFC in step SM002.

After receiving the connection information, the control unit 41 of the smartphone 20 transmits the authentication information and the processing information to the image forming device 10 through wireless LAN in accordance with an IP address of the image forming device 10, which is the connection information, in step ST003.

After receiving the authentication information and the processing information, the control unit 31 of the image forming device 10 performs authentication processing in accordance with the authentication information in step SM003.

When the authentication processing is successful, the control unit 31 executes a job in accordance with the processing information in step SM004. When the authentication processing is not successful, the control unit 31 stops the process, and transmits an error notification to the smartphone 20.

After executing the job, the control unit 31 performs authentication cancellation processing in step SM005. Then, the control unit 31 transmits a job completion notification in step SM006.

After receiving the job completion notification, the control unit 41 of the smartphone 20 provides a job completion display on the application in step ST004.

Second Exemplary Embodiment

In the first exemplary embodiment, the image forming system in which only a single tap on the NFC reader of the image forming device 10 with the smartphone 20 by the user allows the image forming device 10 to perform the process from the authentication processing to execution of a job has been described.

In a second exemplary embodiment, an aspect in which the image forming device 10 performs a job hold process when acquiring authentication information and processing information will be described.

The hardware configuration of the image forming device 10 and the smartphone 20 according to the second exemplary embodiment is the same as that in the first exemplary embodiment. Thus, description of the hardware configuration of the image forming device 10 and the smartphone 20 according to the second exemplary embodiment will be omitted.

In the second exemplary embodiment, the control unit 31 of the image forming device 10 stores received processing information, and executes a job based on the stored processing information when receiving an operation for executing the job based on the stored processing information at a time different from the time of reception of the stored processing information. The processing information is stored in, for example, the storing unit 13.

With the configuration described above, the image forming device 10 performs hold processing for retaining received processing information and putting on hold a process. In the second exemplary embodiment, when the smartphone 20 is tapped on the NFC reader of the image forming device 10 while the image forming device 10 is performing the hold processing, the hold processing is canceled, and the job based on the stored processing information is executed.

In the second exemplary embodiment, the NFC communication function of the smartphone 20 is switched ON and OFF by the control unit 41. After transmitting authentication information and processing information to the image forming device 10 through wireless LAN, the control unit 41 enables NFC for executing a job based on the stored processing information. "Enabling NFC" represents turning on the NFC communication function so that NFC between the image forming device 10 and the smartphone 20 is able to be performed.

Figure 9:
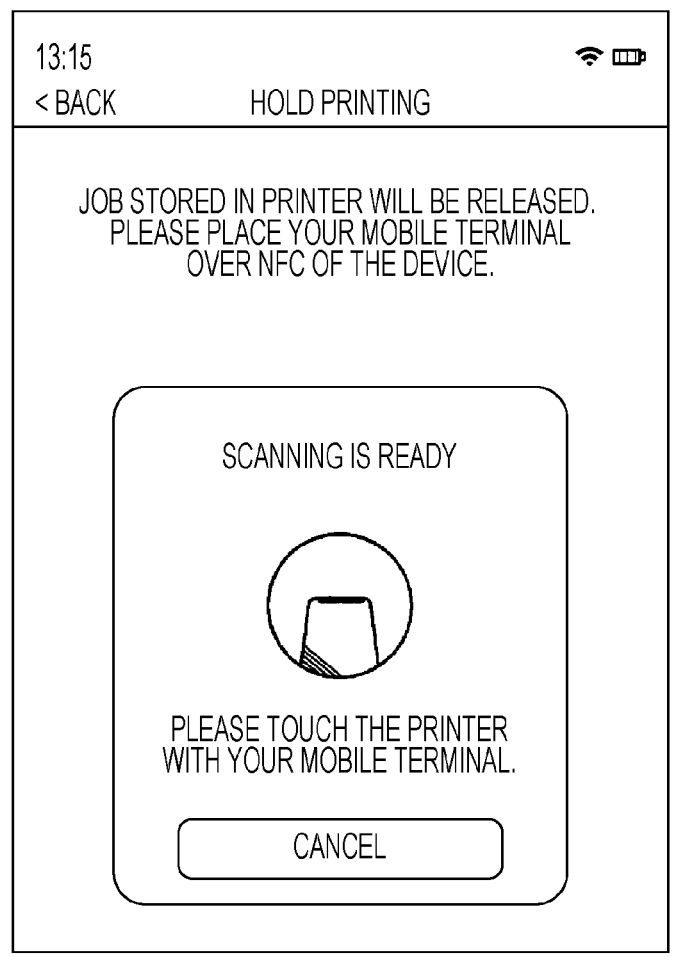
FIG. 9 is a diagram illustrating a display example of a screen prompting NFC displayed on a smartphone according to a second exemplary embodiment of the present disclosure.

Furthermore, after transmitting the authentication information and the processing information to the image forming device 10 through wireless LAN, the control unit 41 switches display on the display unit 42 of the smartphone 20. Switching the display on the display unit 42 in some way allows the user to become aware of tapping the smartphone 20 on the NFC reader of the image forming device 10. However, for example, as illustrated in FIG. 9, it is desirable that a screen prompting NFC be displayed. The screen prompting NFC is, for example, a screen on which a picture or text prompting NFC is displayed, as illustrated in FIG. 9.

It is desirable that, in the case where a setting is made such that the image forming device 10 executes a job based on stored processing information, a screen prompting NFC be displayed. Specifically, as setting for executing a job based on stored processing information, in the case where a hold cancellation display switch SW1 is turned on, for example, on a setting screen illustrated in FIG. 10, the control unit 41 displays the screen prompting NFC, as illustrated in FIG. 9.

Furthermore, in the case where a setting is made such that a confirmation screen for confirming whether or not to execute a job based on the stored processing information is displayed, the control unit 41 may display the confirmation screen. When an instruction for executing the job based on the stored processing information is input on the displayed confirmation screen, the instruction for executing the job based on the stored processing information may be able to be performed.

Figure 10:
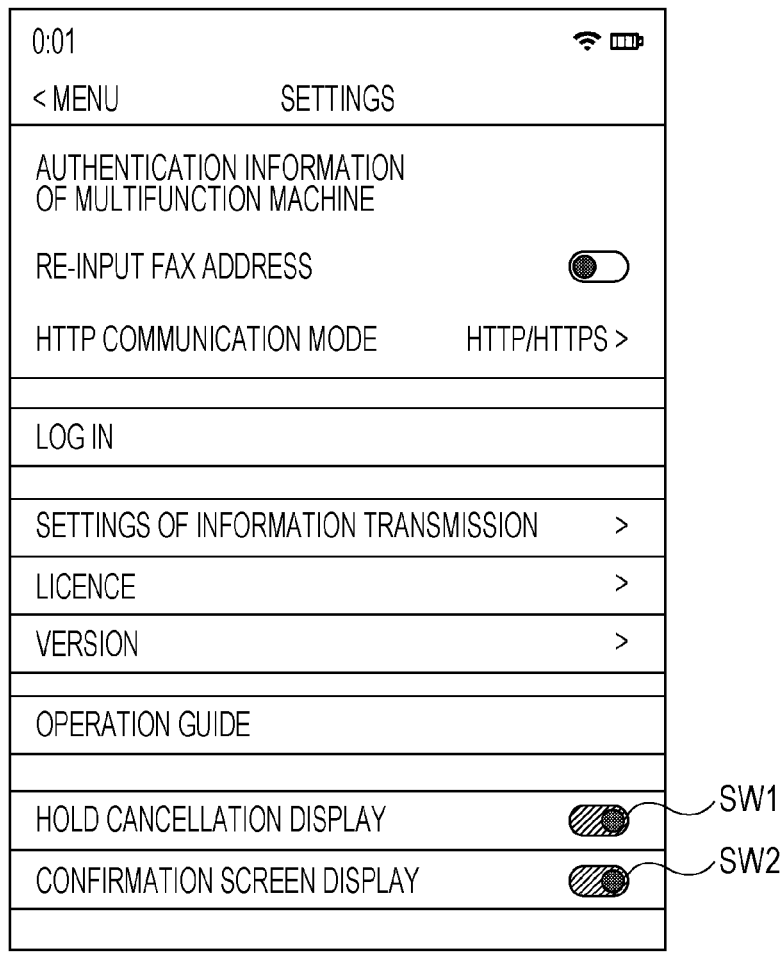
FIG. 10 is a diagram illustrating a display example of a presetting screen displayed on the smartphone according to the second exemplary embodiment of the present disclosure.
Figure 11:
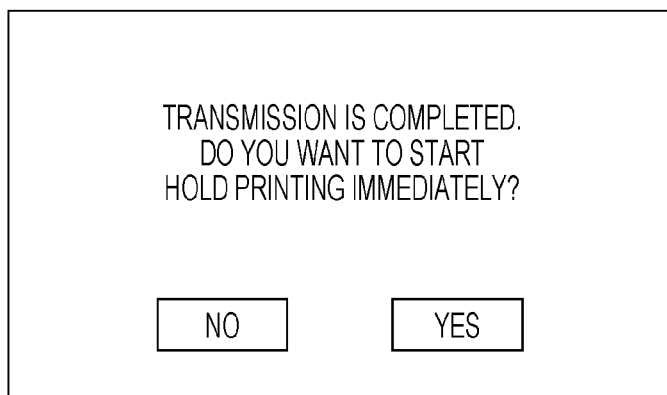
FIG. 11 is a diagram illustrating a display example of a confirmation screen displayed on the smartphone according to the second exemplary embodiment of the present disclosure.

Specifically, in the case where a confirmation screen display switch SW2 is turned on, for example, on the setting screen illustrated in FIG. 10, a confirmation screen illustrated in FIG. 11 is displayed. As text for confirming whether or not to execute a job on which hold processing has been performed, for example, text such as "Do you want to start hold printing immediately?" is displayed on the confirmation screen. When "Yes" is selected on the confirmation screen, the control unit 41 displays the screen prompting NFC as illustrated in FIG. 9, and enables an instruction for executing the job based on the stored processing information to be performed.

"Enabling an instruction for executing the job based on the stored processing information to be performed" represents enabling at least NFC and enabling an instruction for canceling hold processing to be transmitted at a necessary time in the case where an instruction needs to be transmitted to cancel the hold processing.

When "No" is selected on the confirmation screen, the NFC communication function may be turned off. Alternatively, transmission of an instruction for canceling the hold processing may be prohibited with the NFC communication function being kept on.

Furthermore, in the case where the hold cancellation display switch SW1 is turned on and the confirmation screen display switch SW2 is turned off, the control unit 41 transmits authentication information and processing information to the image forming device 10 through wireless LAN and then displays the screen prompting NFC as illustrated in FIG. 9, without displaying the confirmation screen.

When a setting is made such that the image forming device 10 does not execute a job based on the stored processing information, the control unit 41 may disable an instruction for executing the job based on the stored processing information to be performed.

Specifically, for example, as setting for executing a job based on the stored processing information, when the hold cancellation display switch SW1 is turned off on the setting screen illustrated in FIG. 10, the control unit 41 disables an instruction for executing the job based on the stored processing information to be performed.

"Disabling an instruction for executing the job based on the stored processing information to be performed" represents, for example, disabling an instruction for executing a job to be performed by, for example, turning off the NFC communication function or prohibiting transmission of an instruction for canceling the hold processing with the NFC communication function being kept on.

After performing NFC for executing the job based on the stored processing information, the control unit 41 of the smartphone 20 may transmit authentication information to the image forming device 10 through wireless LAN. After acquiring the authentication information, the control unit 31 of the image forming device 10 may execute the job based on the stored processing information transmitted from a user specified by the acquired authentication information.

Multiple users may access the image forming device 10, and multiple pieces of processing information may be transmitted from a user before hold processing is canceled. Thus, by causing the image forming device 10 to acquire authentication information when canceling hold processing and execute only a job based on stored processing information transmitted from a user specified by the acquired authentication information, a job for another user is prevented from being executed.

In this case, after acquiring the authentication information, the control unit 31 of the image forming device 10 may transmit list information of jobs based on stored processing information transmitted from a user specified by the acquired authentication information to the smartphone 20, and the control unit 41 of the smartphone 20 may notify the image forming device 10 of, as a process to be performed, a process specified for the user from the received list information.

Next, a process performed by the image forming system according to the second exemplary embodiment will be described with reference to flowcharts illustrated in FIGS. 12 and 13.

First, in step SU101, the user starts, using the smartphone 20, an application for controlling the image forming device 10. In response to this, in step ST101, the control unit 41 of the smartphone 20 starts the application for controlling the image forming device 10.

Next, in step SU102, the user inputs, on the application, authentication information and processing information. In response to this, in step ST102, the control unit 41 of the smartphone 20 acquires the authentication information and the processing information.

Next, in step SU103, the user taps the NFC reader of the image forming device 10 with the smartphone 20.

In response to this, the control unit 31 of the image forming device 10 detects NFC connection in step SM101, and transmits connection information to the smartphone 20 through NFC in step SM102.

After receiving the connection information, the control unit 41 of the smartphone 20 transmits the authentication information and the processing information to the image forming device 10 through wireless LAN in accordance with an IP address of the image forming device 10, which is the connection information, in step ST103.

After receiving the authentication information and the processing information, the control unit 31 of the image forming device 10 performs authentication processing in accordance with the authentication information in step SM103.

When the authentication processing is successful, the control unit 31 performs job hold processing in step SM104. When the authentication processing is not successful, the control unit 31 stops the process and transmits an error notification to the smartphone 20.

In step SU104, with the job hold processing being executed, the user taps the NFC reader of the image forming device 10 with the smartphone 20 to cancel the job hold processing.

In response to this, the control unit 31 of the image forming device 10 detects NFC connection in step SM105, and transmits connection information to the smartphone 20 through NFC in step SM106.

After receiving the connection information, the control unit 41 of the smartphone 20 transmits the authentication information to the image forming device 10 through wireless LAN in accordance with an IP address of the image forming device 10, which is the connection information, in step ST104.

After receiving the authentication information, the control unit 31 of the image forming device 10 transmits list information of jobs based on the stored processing information transmitted from a user specified by the received authentication information in step SM107.

After receiving the list information, the control unit 41 of the smartphone 20 displays the list information on the application in step ST105.

In step SU105, the user specifies and inputs, on the application, a job to be executed from the list information. In response to this, in step ST106, the control unit 41 of the smartphone 20 notifies the image forming device 10 of the job specified by the user.

The control unit 31 of the image forming device 10 performs hold cancellation processing for the job specified by the user in step SM108, and executes the job specified by the user in accordance with the processing information in step SM109.

After executing the job, the control unit 31 performs authentication cancellation processing in step SM110, and transmits a job completion notification in step SM111.

After receiving the job completion notification, the control unit 41 of the smartphone 20 provides a job completion display on the application in step ST107.

In the second exemplary embodiment, after acquiring authentication information, the control unit 31 of the image forming device 10 may transmit list information of jobs based on stored processing information transmitted from a user specified by the acquired authentication information to the smartphone 20, and the control unit 41 of the smartphone 20 may notify the image forming device 10 of all the processes in the received list information as processes to performed. At this time, the control unit 41 may or may not notify the user of the list information.

Furthermore, after NFC for executing a job based on stored processing information is performed, the control unit 41 may notify the image forming device 10 of jobs based on all the stored processing information as processes to be performed, without acquiring the list information of the jobs based on the stored processing information from the image forming device 10.

Furthermore, in the second exemplary embodiment, an aspect in which the NFC communication function of the smartphone 20 is switched ON and OFF by the control unit 41 has been described. However, the NFC communication function of the smartphone 20 may be kept turned on.

[Modifications]

The image forming systems according to the exemplary embodiments of the present disclosure have been described above. However, the present disclosure is not limited to the exemplary embodiments describe above and changes may be made to the present disclosure in an appropriate manner.

Furthermore, in the exemplary embodiments described above, the case where an image forming device is used as an information processing device is described. However, the present disclosure is not limited to this case. Other devices such as a personal computer or a portable terminal device may be used as the information processing device.

In the exemplary embodiments described above, the case where a smartphone is used as a terminal device has been described. However, the present disclosure is not limited to this case. Other devices such as a personal computer or a portable terminal device may be used as the terminal device.

In the exemplary embodiments described above, the case where wireless LAN is used as wireless communication based on a second wireless communication method has been described. However, the present disclosure is not limited to this case. Wireless communication based on other wireless communication methods may be used as the wireless communication based on the second wireless communication method.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
a first processor including:
an information processing device configured to, when connecting to an external device through wireless communication based on a first wireless communication method, which is a short-range wireless communication, transmit connection information for connecting to the information processing device through wireless communication based on a second wireless communication method different from the first wireless communication method to the connected external device; and
a second processor including:
a terminal device configured to:
acquire the connection information by connecting to the information processing device through the wireless communication based on the first wireless communication method; and
connect to the information processing device through the wireless communication based on the second wireless communication method in accordance with the acquired connection information and transmit authentication information for the information processing device to perform authentication processing, wherein
the first processor is configured to store received processing information, perform a hold processing for the stored processing information and perform a process based on the stored processing information at a timing different from a timing of reception of the processing information when the terminal device executes the first wireless communication method, wherein
the second processor is configured to, after transmitting the authentication information and the processing information to the information processing device through the wireless communication based on the second wireless communication method, display a screen prompting the short-range wireless communication with the information processing device on an application of the terminal device in a case where setting is made such that the process based on the stored processing information is performed by the information processing device.

2. The information processing system according to claim 1, wherein the second processor is configured to connect to the information processing device through the wireless communication based on the second wireless communication method in accordance with the acquired connection information and transmit, along with the authentication information, the processing information for the information processing device to perform the process.

3. The information processing system according to claim 2, wherein the first processor is configured to, in a case where the first processor has received the authentication information and the processing information from the terminal device, perform the authentication processing in accordance with the received authentication information and then perform the process based on the received processing information.

4. The information processing system according to claim 3, wherein the first processor is configured to, after performing the process based on the processing information, perform authentication cancellation processing for the terminal device.

5. The information processing system according to claim 1, wherein the second processor is configured to, after transmitting the authentication information and the processing information to the information processing device through the wireless communication based on the second wireless communication method, switch display on a screen of the terminal device.

6. The information processing system according to claim 1, wherein the second processor is configured to, in a case where setting is made such that a confirmation screen for confirming whether or not to perform the process based on the stored processing information is displayed, display the confirmation screen and enable an instruction for performing the process based on the stored processing information to be performed when the instruction for performing the process based on the stored processing information is input on the displayed confirmation screen.

7. The information processing system according to claim 1,
wherein the second processor is configured to:
after performing the wireless communication based on the first wireless communication method for performing the process based on the stored processing information, transmit the authentication information to the information processing device through the wireless communication based on the second wireless communication method; and
wherein the first processor is configured to, after acquiring the authentication information, perform the process based on the stored processing information transmitted from a user specified by the acquired authentication information.

8. The information processing system according to claim 7,
wherein the first processor is configured to, after acquiring the authentication information, transmit list information of processes based on the stored processing information transmitted from the user specified by the acquired authentication information to the terminal device, and
wherein the second processor is configured to notify the information processing device of, as a process to be performed, a process specified by the user from the received list information.

9. The information processing system according to claim 7,
wherein the first processor is configured to, after acquiring the authentication information, transmit list information of processes based on the stored processing information transmitted from the user specified by the acquired authentication information to the terminal device, and
wherein the second processor is configured to notify the information processing device of, as processes to be executed, all processes in the received list information.

10. The information processing system according to claim 1, wherein the second processor is configured to, after transmitting the authentication information and the processing information to the information processing device through the wireless communication based on the second wireless communication method, enable the wireless communication based on the first wireless communication method for performing the process based on the stored processing information.

11. A terminal device comprising:
a processor configured to:
acquire, by connecting to an information processing device through wireless communication based on a first wireless communication method, which is a short-range wireless communication, connection information for connecting to the information processing device through wireless communication based on a second wireless communication method different from the first wireless communication method from the information processing device; and
connect to the information processing device through the wireless communication based on the second wireless communication method in accordance with the acquired connection information and transmit authentication information for the information processing device to perform authentication processing, wherein
the information processing device stores received processing information, performs a hold processing for the stored processing information and performs a process based on the stored processing information at a timing different from a timing of reception of the processing information when the terminal device executes the first wireless communication method, and wherein
the processor is configured to, after transmitting the authentication information and the processing information to the information processing device through the wireless communication based on the second wireless communication method, display a screen prompting the short-range wireless communication with the information processing device on an application of the terminal device in a case where setting is made such that the process based on the stored processing information is performed by the information processing device.

12. The terminal device according to claim 11, wherein the processor is configured to, after transmitting the authentication information and the processing information to the information processing device through the wireless communication based on the second wireless communication method, enable the wireless communication based on the first wireless communication method for performing the process based on the stored processing information.

13. A non-transitory computer readable medium storing a program causing a computer to execute a process, the process comprising:
acquiring, by connecting to an information processing device through wireless communication based on a first wireless communication method, which is a short-range wireless communication, connection information for connecting to the information processing device through wireless communication based on a second wireless communication method different from the first wireless communication method from the information processing device; and
connecting to the information processing device through the wireless communication based on the second wireless communication method in accordance with the acquired connection information and transmitting authentication information for the information processing device to perform authentication processing, wherein
the information processing device stores received processing information, performs a hold processing for the stored processing information and performs a process based on the stored processing information at a timing different from a timing of reception of the processing information when the terminal device executes the first wireless communication method, and wherein the process further comprises:

after transmitting the authentication information and the processing information to the information processing device through the wireless communication based on the second wireless communication method, displaying a screen prompting the short-range wireless communication with the information processing device on an application of the terminal device in a case where setting is made such that the process based on the stored processing information is performed by the information processing device.

14. The non-transitory computer readable medium according to claim 13, wherein the process further comprises:

after transmitting the authentication information and the processing information to the information processing device through the wireless communication based on the second wireless communication method, enabling the wireless communication based on the first wireless communication method for performing the process based on the stored processing information.

* * * * *